United States Patent [19]

Teraoka et al.

[11] Patent Number: 4,572,955

[45] Date of Patent: Feb. 25, 1986

[54] RADIATION IMAGE STORAGE PANEL

[75] Inventors: Masanori Teraoka; Terumi Matsuda; Hisashi Yamazaki, all of Kaisei, Japan

[73] Assignee: Fuji Photo Film Co., Ltd., Kanagawa, Japan

[21] Appl. No.: 545,163

[22] Filed: Oct. 25, 1983

[30] Foreign Application Priority Data

Oct. 26, 1982 [JP] Japan ............................... 57-186674

[51] Int. Cl.[4] ........................ G01J 1/58; G01N 21/64; G01T 1/00; H05B 33/00

[52] U.S. Cl. ............................... 250/483.1; 250/484.1

[58] Field of Search ........................... 250/483.1, 484.1

[56] References Cited

U.S. PATENT DOCUMENTS 4,259,588 3/1981 Luckey et al. .................. 250/483.1

*Primary Examiner*—James R. Hoffman
*Attorney, Agent, or Firm*—Murray, Whisenhunt & Ferguson

[57] ABSTRACT

A radiation image storage panel comprising a support and a phosphor layer provided thereon which comprises a binder and a stimulable phosphor dispersed therein, characterized in that a friction-reducing layer having a surface of a friction coefficient of not more than 0.6 is provided on the support-side surface and/or the phosphor layer-side surface thereof.

7 Claims, No Drawings

RADIATION IMAGE STORAGE PANEL

BACKGROUND OF THE INVENTION

1. Field of the Invention

The present invention is relates to a radiation image storage panel, and more particularly, to a radiation image storage panel improved in the resistance to physical deterioration such as abrasion.

2. Description of the Prior Art

For obtaining a radiation image, there has been conventionally employed a radiography utilizing a combination of a radiographic film having an emulsion layer containing a photosensitive silver salt material and an intensifying screen.

As a method replacing the above-described radiography, a radiation image recording and reproducing method utilizing a stimulable phosphor as described, for instance, in U.S. Pat. No. 4,239,968, has been recently paid much attention. In the radiation image recording and reproducing method, a radiation image storage panel (a stimulable phosphor sheet) comprising a stimulable phosphor is employed, and the method involves steps of causing the stimulable phosphor of the panel to absorb a radiation energy having passed through an object or having been radiated by an object; exciting the stimulable phosphor, or scanning the panel, with an electromagnetic wave such as visible light and infrared rays (hereinafter referred to as "stimulating rays") to sequentially release the radiation energy stored in the stimulable phosphor as light emission (stimulated emission); photo-electrically processing the emitted light to give electric signals; and reproducing a visible image from the electric signals.

The radiation image storage panel employed in the method hardly deteriorates even upon exposure to a radiation and stimulating rays, so that the panel can be employed repeatedly for a long period. In practical use, after scanning the panel with stimulating rays to release radiation energy as stimulated emission therefrom (otherwise, in advance of next use of the panel), light in the wavelength region of stimulating rays for the phosphor or heat is usually applied to the panel so as to erase the radiation energy stored in the panel, because the radiation energy stored in the panel cannot be fully released even after scanning with the stimulating rays.

In the above-discribed radiation image recording and reproducing method, a radiation image can be obtained with a sufficient amount of information by applying a radiation to the object at considerably smaller dose, as compared with the case of using the conventional radiography. Accordingly, this radiation image recording and reproducing method is of great value especially when the method is used for medical diagnosis.

The radiation image storage panel employed in the radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock. Furthermore, the edge faces of the panel may be reinforced by coating with a polymer material to enhance the mechanical strength, as described in Japanese Patent Provisional Publication No. 58(1983)-68746 (corresponding to U.S. patent application Ser. No. 434,885, now U.S. Pat. No. 4,510,388 and European Patent Publication No. 83470).

As described above, the radiation image storage panel is employed repeatedly in a cyclic procedure comprising steps of erasing the remaining energy from the panel, exposing the panel to a radiation, and scanning the panel with stimulating rays (that is, reading out the radiation image as stimulated emission from the panel). In the above-mentioned cyclic procedure, the panel is carried from one step to the next step through a certain transfer system and generally piled upon other panels to store after one cycle is finished.

Accordingly, the radiation image storage panel employed in the radiation image recording and reproducing method is subjected to conditions quite different from those to which the intensifying screen is subjected in the conventional radiography, that is, the screen is fixed in a cassette. For the reason, various troubles which never occur in the use of the intensifying screen are encountered in the use of the radiation image storage panel.

For instance, both surfaces of the radiation image storage panel are sometimes damaged by physical contact such as rubbing of a surface (the phosphor layser-side surface) of the panel against a surface (the support-side surface) of another panel, or rubbing of a surface of the panel against an edge of another panel, when the panel is piled on the other panel or moved from the pile to the transfer system in the repetitious use comprising transfering and piling of the panel. Particularly, the physical damage occurring on the phosphor layer-side surface is liable to cause scattering of stimulating rays, resulting in decrease of an amount and obscurity of image information to be obtained. In other words, when the radiation image is reproduced as a visible image, the quality of the visible image becomes extremely poor.

Accordingly, the conventional radiation image storage panel having a basic structure comprising a support and a phosphor layer provided thereon is desired to suffer minimum damage on both surfaces thereof, especially on the phosphor layer-side surface thereof.

SUMMARY OF THE INVENTION

Accordingly, an object of the present invention is to provide a radiation image storage panel improved in the resistance to physical deterioration such as abrasion.

The above-described object is accomplished by a radiation image storage panel of the present invention comprising a support and a phosphor layer provided thereon which comprises a binder and a stimulable phosphor dispersed therein, characterized in that a friction-reducing layer having a surface of a friction coefficient of not more than 0.6 is provided on at least one of the support-side surface and the phosphor layer-side surface thereof.

In the present specification, the term "support-side surface" of the panel means a free surface (surface not facing the phosphor layer) of the support, and the term "phosphor layer-side surface" of the panel means a free surface (surface not facing the support) of the phosphor layer or a free surface of an additional layer optionally provided on the phosphor layer such as the protective film.

The term "friction coefficient" as used herein means a kinetic friction coefficient which represents an amount of kinetic friction given to an object moving at a certain rate, and is determined by the following method.

The radiation image storage panel is cut to give a square test strip (2 cm×2 cm), and the test strip is placed on a polyethylene terephthalate sheet in such a manner that a surface of the panel to be measured on the friction coefficient faces the polyethylene terephthalate sheet. A weight is placed on the test strip to apply a total weight of 100 g. onto the face of the polyethylene terephthalate sheet. Then, the test strip having the weight thereon is pulled at a rate of 4 cm/min. by means of a tensile testing machine (Tensilon UTM-11-20, trade name, manufactured by Toyo Baldwin Co., Ltd., Japan) under the conditions of a temperature of 25° C. and a humidity of 60%, to measure a tensile force F (g.) of the test strip moving at a rate of 4 cm/min. From the measured tensile force F and the applied weight (100 g.), the friction coefficient is determined as a value of (tensile force)/(applied weight).

DETAILED DESCRIPTION OF THE INVENTION

The radiation image storage panel of the present invention is improved in the resistance to physical deterioration such as abrasion being liable to suffer on the surfaces of the panel by providing a friction-reducing layer having a surface whose friction coefficient is not more than 0.6 on the support-side surface and/or the phosphor layer-side surface of the panel. The provision of the friction-reducing layer on the panel can effectively prevent the damage which is liable to occur on the surfaces of the panel through physical contact with another panel encountered when the panel is piled on another panel or transferred from the pile, such as rubbing of the surface of the panel agsinst a surface of another panel. Especially the damage which is apt to be given to the phosphor layer-side surface of the panel under the piling can be effectively prevented. Accordingly, in the case that the radiation image storage panel of the present invention is used, a radiation image having higher quality can be obtained than the case using the conventional panel provided with no friction-reducing layer.

The radiation image storage panel of the present invention having the above-described preferable characteristics can be prepared, for instance, in a manner described below.

The support material employed in the present invention can be selected from those employed in the conventional radiographic intensifying screens. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From a viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of the conventional radiation image storage panel, one or more additional layers are occassionally provided between the support and the phosphor layer, so as to enhance the adhesion between the support and the phosphor layer, or to improve the sensitivity of the panel or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided depending on the type of the radiation image storage panel to be obtained.

As described in Japanese Patent Application No. 57(1982)-82431 (which corresponds to U.S. patent application Ser. No. 496,278 and the whole content of which is described in European Patent Publication No. 92241), the phosphor layer side surface of the support (or the surface of an adhesive layer, light-reflecting layer, or light-absorbing layer in the case where such layers provided on the phosphor layer) may be provided with protruded and depressed portions for enhancement of the sharpness of radiographic image, and the constitution of those protruded and depressed portions can be selected depending on the purpose of the radiation image storage panel.

Onto the support, a phosphor layer is provided. The phosphor layer may be a single phosphor layer or a plurality of the same or different phosphor layers superposed one on another.

The phosphor layer comprises a binder and phosphor particles dispersed therein.

The stimulable phosphor particles, as described hereinbefore, give stimulated emission when excited by stimulating rays after exposure to a radiation. In the viewpoint of practical use, the stimulable phosphor is desired to give stimulated emission in the wavelength region of 300–500 nm when excited by stimulating rays in the wavelength region of 400–850 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO.x$Al_2O_3$:Eu, in which x is a number satisfying the condition of $0.8 \leqq x \leqq 10$, and $M^{2+}$O.x$SiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$, and $xy=0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078; and $(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively as described in Japanese Patent Provisional Publication No. 55(1980)-12145.

The above-described stimulable phosphor are given by no means to restrict the stimulable phosphor employable in the present invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the support, for instance, by the following procedure.

In the first place, phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol, and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to increase the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of the support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within a range of from 20 $\mu$m to 1 mm, preferably from 50 to 500 $\mu$m.

The phosphor layer can be provided on the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The radiation image storage panel generally has a transparent film on a free surface of a phosphor layer to protect the phosphor layer from physical and chemical deterioration. In the panel of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approximately 3 to 20 $\mu$m.

Then, a friction-reducing layer is formed on the panel comprising a support and a phosphor layer (and further an optional protective film).

The friction-reducing layer, which is a characteristic requisite of the present invention, can be formed, for instance, by fixing a sheet made of a material having a small friction coefficient or a sheet having a surface whose friction coefficient has been lowered by a physical or chemical processing onto the above-discribed panel through an appropriate adhesive agent. A representative example of the material having a small friction coefficient is a polyfluoroethylene film such as a Teflon film. Examples of the sheet having a surface whose friction coefficient has been lowered by a physical or chemical processing include plastic films such as a polyethylene terephthalate film and a plyolefin film (e.g. a polyethylene film, a polypropylene film or the like) having been subjected to a surface-roughing processing. The above-described materials are given by no means to restrict the material employable for the friction-reducing layer in the present invention. Any other materials can be also employed, provided that the material has a small friction coefficient on its surface and can be provided onto the above-described panel using an adhesive agent or the like.

Further, the friction-reducing layer may be formed by coating a lubricant over a surface of the above-described panel comprising a support and a phosphor layer. The lubricant employable in the present invention can be chosen from a variety of known lubricants. Examples of the lubricant include silicone oil, higher fatty acids such as oleic acid, myristic acid and stearic acid; esters of those higher fatty acids; salts of those higher fatty acids; and fluorine-containing surface active agents.

Otherwise, the friction-reducing layer can be formed through another procedure such as a procedure of coating a matting agent over the above-described panel.

In the present invention, the friction-reducing layer is provided on either the support-side surface or the phosphor layer-side surface of the panel, otherwise on the both of them. Preferably, the friction-reducing layer is formed on the phosphor layer-side surface of the panel, because the scattering or refraction of light occurring at a damaged portion is necessarily prevented particularly on the phosphor layer-side surface. Further, from the viewpoint of the sensitivity of the panel and the quality of the image (sharpness and graininess etc.) provided thereby, the friction-reducing layer is preferably formed by applying a lubricant over the phosphor layer-side surface of the panel. It is preferable that the support-side surface of the panel is provided with the friction-reducing layer made of a plastic film having been subjected to a surface-roughing processing, because support-side surface of the panel is not under restriction concerning the optical characteristics.

As described above, it is not necessary that the friction-reducing layer is directly formed on the support-side surface and/or the phosphor layer-side surface of the completed panel comprising the support and the phosphor layer provided thereon (and further the optional protective film). The above-mentioned friction reducing layer may be beforehand formed on either or both of the support and the independently prepared phosphor layer or the protective film, and then these elements are combined by using an adhesive agent or by other means.

In the present invention, the friction-reducing layer is provided on at least one surface of the radiation image storage panel as described above, so as to reduce a friction coefficient of at least one surface of the resulting panel to a value of not more than 0.6. Preferably, the value is adjusted to be not more than 0.5.

For further improvement of the transferability and the resistance to physical deterioration such as abrasion of the radiation image storage panel, the panel of the present invention is preferably chamfered on the edges thereof and then covered on the edge faces thereof including the chamfered edge with a polymer material. The chamfering and covering can be carried out in the manner as described in Japanese Patent Application No. 57(1982)-87799 (corresponding to U.S. patent application Ser. No. 496,731, now U.S. Pat. No. 4,511,802 and European Patent Application No. 83105137.0).

The chamfering is preferably applied to the front edge (viewed along the forwarding direction) of the panel on the support-side for facilitating transfer of the panel. It is more preferable to chamfer all edges of the panel on the support-side for more completely preventing a damage occurring on the surface of the panel. Furthermore, it is preferable to chamfer the edges on the phosphor layer-side as well as on the support-side, so as to further improve both the easiness for transferring the panel and the resistance to physical deterioration of the panel. The so chamfered edge may have a flat face or a curved face.

In the present specification, the term "edge on the support-side" of the panel means an edge of the support including a friction-reducing layer provided thereon, if the friction-reducing layer is provided on the surface of the support as described hereinbefore. Likewise, the term "edge on the phosphor layer-side" of the panel means an edge of the phosphor layer (or of the protective film) including a friction-reducing layer, if the friction-reducing layer is provided on the surface of the phosphor layer (or on the surface of the protective film).

The chamfering of the edge on the support-side of the panel should be preferably done in a depth within the range of 1/50 to 1/1 against the thickness of the support, measured in the direction vertical to the panel. Likewise, the chamfering of the edge on the phosphor layer-side of the panel should be preferably done in a depth within the range of 1/50 to 1/1 against the thickness of the phosphor layer. When an edge on the support-side and an edge on the phosphor layer-side opposite to said edge on the support-side are to be chamfered, the depth of at least one chamfered space is preferably adjusted to a level of less than 1/1 (against the same as above) so that the edge chamfered on both sides might not form a sharp edge.

The radiation image storage panel chamfered as described above may be covered with a polymer material on its edge faces.

The materials employable for edge-reinforcing the edge faces can be chosen from those generally known as polymer materials. For instance, there can be mentioned the following polyurethane and acrylic resins which are described in the aforementioned Japanese Patent Provisional Publication No. 58(1983)-68746.

Preferred polyurethane is a polymer having urethane groups —NH—COO) in the molecular chain. Examples of such polyurethane include a polyaddition reaction product of 4,4'-diphenylmethane diisocyanate with 2,2'-diethyl-1,3-propanediol, a polyaddition reaction product of hexamethylene diisocyanate with 2-n-butyl-2-ethyl-1,3-propanediol, a polyaddition reaction product of 4,4'-diphenylmethane diisocyanate with bisphenol A, and a polyaddition reaction product of hexamethylene diisocyanate with resorcinol.

Examples of the acrylic resin include homopolymers of acrylic acid, methyl acrylate, ethyl acrylate, butyl acrylate, methylacrylic acid and methylmethacrylic acid; and copolymers of these monomers with other monomers such as an acrylic acid-styrene copolymer and an acrylic acid-methyl methacrylate copolymer. Particularly preferred material is poly(methyl methacrylate), namely, a homopolymer of methyl methacrylate, and it is preferred to employ an acrylic resin having a polymerization degree ranging from $10^4$ to $5\times10^5$.

Further, a mixture of the above-described polyurethane or acrylic resins (especially acrylic resins) with other various polymer materials (polymers for blending) can be also employed for edge-reinforcing edge face of the panel. Most preferred polymer for blending is a vinyl chloride-vinyl acetate copolymer. A representative example of the blended resin is a mixture of an acrylic resin and a vinyl chloride-vinyl acetate copolymer, the latter containing vinyl chloride in a ratio of 70–90% and having a polymerization degree of 400–800, in a mixing ratio of 1:1 to 4:1, by weight.

The present invention will be illustrated by the following examples, but these examples by no means restrict the invention.

EXAMPLE 1

To a mixture of an europium activated barium fluorobromide stimulable phosphor (BaFBr:Eu) and a linear polyester resin were added successively methyl ethyl ketone and nitrocellulose (nitrification degree: 11.5%), to prepare a dispersion containing the phosphor particles. Subsequently, tricresyl phosphate, n-butanol and methyl ethyl ketone were added to the resulting dispersion. The mixture was sufficiently stirred by means of a propeller agitator to obtain a homogeneous coating dispersion having a viscosity of 25–35 PS (at 25° C.).

The coating dispersion was applied to a polyethylene terephthalate sheet (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having thickness of 300 μm was formed on the support.

On the phosphor layer was placed a polyethylene terephthalate transparent film (thickness: 12 μm; provided with a polyester adhesive layer on one surface) to combine the film and the phosphor layer with the adhesive layer, to form a transparent protective film thereon.

Then, silicone oil was coated over the surface of the protective film by using a cloth followed by wiping with a dry cloth, to form a friction-reducing layer on the protective film.

Thus, a radiation image storage panel consisting essentially of a support, a phosphor layer, a protective film and a friction-reducing layer, superposed in this order, was prepared.

EXAMPLE 2

By using the same materials as employed in Example 1, a phosphor layer and a transparent protective film were successively formed on a support in the same manner as described in Example 1.

Over the surface of the protective film, a methanol solution of a fatty acid ester of neopentylpolyol (Unistar-H-381, trade name, produced by Nippon Oils & Fats Co., Ltd., Japan) was coated by using a cloth followed by wiping with a dry cloth, to form a friction-reducing layer on the protective film.

Thus, a radiation image storage panel consisting essentially of a support, a phosphor layer, a protective film and a friction-reducing layer, superposed in this order, was prepared.

EXAMPLE 3

By using the same materials as employed in Example 1, a phosphor layer and a transparent protective film were successively formed on a support in the same manner as described in Example 1.

Independently, a polyethylene terephthalate film (thickness: 25 μm) was subjected to sand blasting, to provide a rough surface with a great number of pits having a mean diameter of 2 μm, a maximum depth of 7 μm and a mean diameter at the opening of 20 μm. The surface-roughed polyethylene terephthalate film was provided on the free surface of the support under adhesion through an adhesive layer in such a manner that the untreated surface of the film (that is, opposite to the rough surface) is in contact with the adhesive layer, to form a friction-reducing layer on the support.

Thus, a radiation image storage panel consisting essentially of a friction-reducing layer, a support, a phosphor layer and a protective film, superposed in this order, was prepared.

EXAMPLE 4

By using the same materials as employed in Example 1, a phosphor layer and a transparent protective film were successively formed on a support in the same manner as described in Example 1.

Independently, a polyethylene terephthalate film (thickness: 25 μm) was subjected to sand blasting, to provide a rough surface with a great number of pits having a mean diameter of 0.2 μm, a maximum depth of 0.8 μm and a mean diameter at the opening of 0.5 μm. The surface-roughed polyethylene terephthalate film was provided on the free surface of the support under adhesion through an adhesive layer in such a manner that the untreated surface of the film (that is, opposite to the rough surface) is in contact with the adhesive layer, to form a friction-reducing layer on the support.

Thus, a radiation image storage panel consisting essentially of a friction-reducing layer, a support, a phosphor layer and a protective film, superposed in this order, was prepared.

COMPARISON EXAMPLE 1

By using the same materials as employed in Example 1, a phosphor layer and a transparent protective film were successively formed on a support in the same manner as described in Example 1.

Thus, a radiation image storage panel consisting essentially of a support, a phosphor layer and a protective film, superposed in this order, but having no friction-reducing layer was prepared.

The so prepared radiation image storage panels were measured on the friction coefficient of the surface of the friction-reducing layer thereof by the method described hereinbefore and cited below. In the panel prepared in Comparison Example 1, the measurement was carried out on the surface of the support as well as on the surface of the protective film.

The radiation image storage panel was cut to give a square test strip (2 cm×2 cm), and the test strip was placed on a polyethylene terephthalate sheet in such a manner that a friction-reducing layer (or a surface of the panel to be measured on the friction coefficient) faced the polyethylene terephthalate sheet. A weight was placed on the test strip to apply a total weight of 100 g. onto the face of the polyethylene terephthalate sheet. Then, the test strip having the weight thereon was pulled at a rate of 4 cm/min. by means of a tensile testing machine (Tensilon UTM-11-20, trade name, manufactured by Toyo Baldwin Co., Ltd., Japan) under the conditions of a temperature of 25° C. and a humidity of 60%, to measure a tensile force F (g.) of the test strip moving at a rate of 4 cm/min. From the measured tensile force F and the applied weight (100 g.), the friction coefficient was determined as a value of (tensile force)/(applied weight).

Then, the radiation image storage panels were evaluated on the resistance to abrasive damage by observing abrasion produced under the rubbing procedure described below.

The radiation image storage panel was cut to give a rectangular test strip (25.2 cm×30.3 cm) and then subjected to the following procedure.

(1) In the case that the friction-reducing layer was provided on the phosphor layer-side surface of the panel, the test strip was placed on a sheet made of the same material as employed for the support-side surface of the panel (namely, the same polyethylene terephthalate film (sheet) as in the present examples) in such a manner that the friction-reducing layer of the test strip faced the sheet. The test strip was then rubbed against the sheet 1000 times along a rubbing path of 10 cm. After the rubbing was complete, the phosphor layer-side surface of the test strip provided with the friction-reducing layer was evaluated on abrasion visually.

(2) In the case that the friction-reducing layer was provided on the support-side surface of the panel, the test strip was also placed on the polyethylene terephthalate sheet in the same manner as described in the above (1), and then rubbed against the sheet 1000 times along a rubbing path of 10 cm. After the rubbing was complete, the surface of the polyethylene terephthalate sheet was evaluated on abrasion visually. The reason why the observation on the sheet in place of the observation on the friction-reducing layer was done is that the polyethylene terephthalate sheet was presumed to be a specimen of the phosphor layer-side surface of another panel (namely, the protective film).

In the evaluation on the panel of Comprison Example 1, the test strip was at first placed on the sheet in such a manner that the protective film thereof faced the sheet, to evaluate the abrasion produced on the surface of the protective film in the same manner as described in the above (1). The test strip was next placed on the sheet in such a manner that the support thereof faced the sheet, to evaluate the abrasion produced on the surface of the sheet in the same manner as described in the above (2).

The results of the evaluation on the resistance to physical deterioration (abrasive damage) of the radiation image storage panels are marked by the following three levels of A, B and C.

A: Abrasion was hardly observed.

B: A little abrasion was observed, but brought about to the panel no ploblem in practical use.

C: Abrasion was apparently noted.

The results are set forth in Table 1.

TABLE 1

| | Friction Coefficient | Resistance to Abrasion |
|---|---|---|
| Example 1 | 0.44 | A |
| Example 2 | 0.45 | A |
| Example 3 | 0.42 | A |
| Example 4 | 0.50 | B |
| Com. Example 1a | 0.67 | C |
| Com. Example 1b | 0.67 | C |

Remark: Com. Example 1a was evaluated on the phosphor layer-side surface of the panel (the surface of the protective film) in the case the protective film was placed facing the sheet, and Com. Example 1b was evaluated on the sheet in the case the support was placed facing the sheet.

We claim:

1. A radiation image storage panel comprising a support and a phosphor layer provided thereon which comprises a binder and a stimulable phosphor dispersed therein, characterized in that a friction-reducing layer having a surface of a friction coefficient of not more than 0.6 is provided on at least one of the support-side surface and the phosphor layer-side surface thereof.

2. The radiation image storage panel as claimed in claim 1, in which the friction-reducing layer is provided only on the support-side surface.

3. The radiation image storage panel as claimed in claim 1, in which the friction-reducing layer is provided only on the phosphor layer-side surface.

4. The radiation image storage panel as claimed in claim 1, in which the friction-reducing layer is provided both on the support-side surface and on the phosphor layer-side surface.

5. The radiation image storage panel as claimed in any one of claims 1 through 4, in which the friction-reducing layer is made of a lubricant.

6. The radiation image storage panel as claimed in any one of claims 1 through 4, in whcih the friction-reducing layer is a plastic film.

7. The radiation image storage panel as claimed in any one of claims 1 through 4, in which at least one edge on the support-side of said panel is chamfered and edge faces including the chamfered edge are covered with a polymer material.

* * * * *